July 22, 1958
T. B. HANSSEN
2,844,677
SWITCH MECHANISM
Filed Nov. 13, 1956
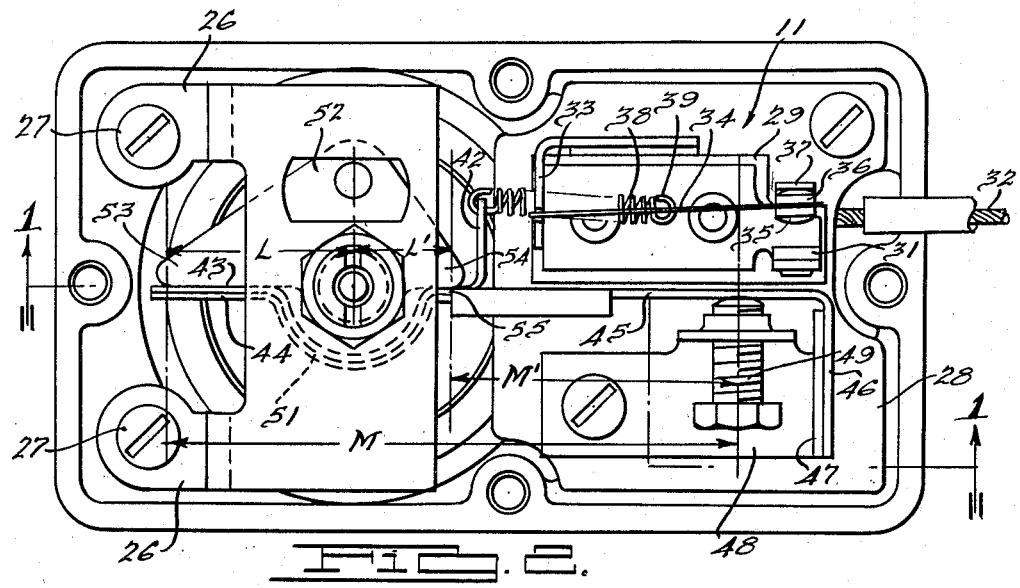
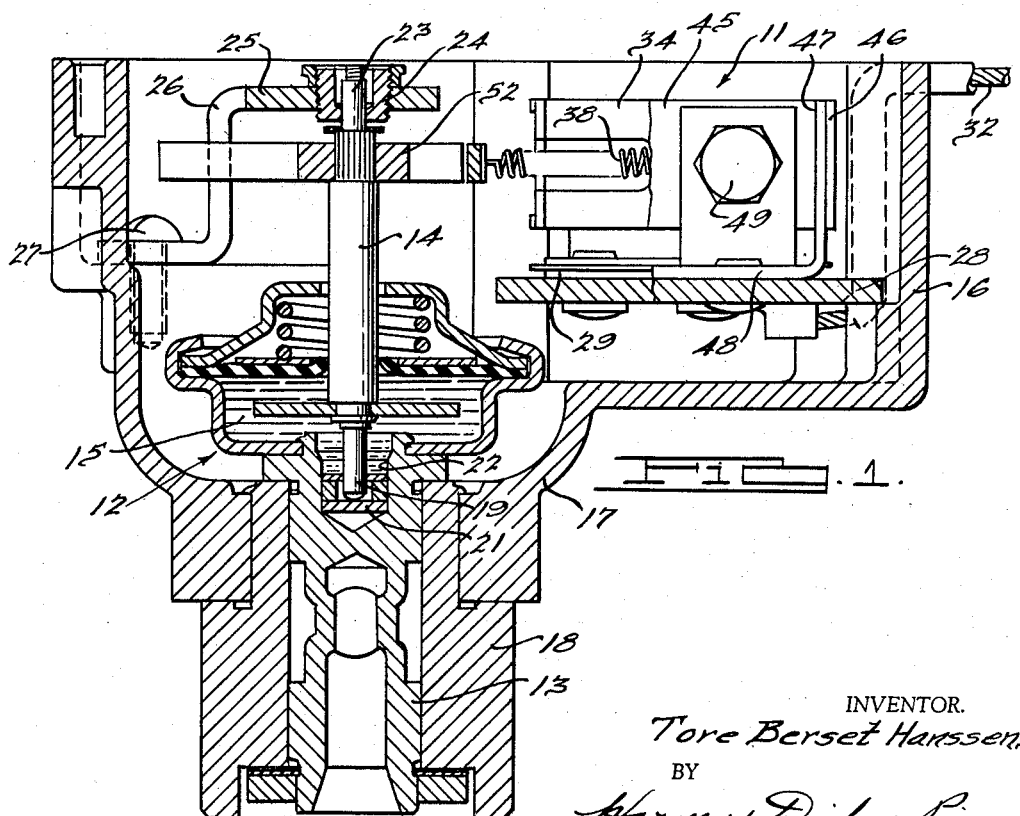
INVENTOR.
Tore Berset Hanssen,
BY
Harness, Dickey & Pierce
ATTORNEYS

# 2,844,677

SWITCH MECHANISM

Tore B. Hanssen, Ann Arbor, Mich., assignor to King-Seeley Corporation, Ann Arbor, Mich., a corporation of Michigan Application November 13, 1956, Serial No. 621,614

5 Claims. (Cl. 200—67)

This invention relates to switch mechanisms, and more particularly to devices for operating snap-action switches upon the attainment of a predetermined torque.

The use of electrical snap-action switches is well known in conjunction with systems in which an operation is performed in response to the attainment of a predetermined torque on a driven member. Examples of such systems are found in automotive applications where speed-responsive switches are used to prevent the actuation of a mechanical parking lock when the vehicle is moving, or to maintain the setting of a brake applied at very low speeds. Among the problems which arise in the construction of switch mechanisms of this type is the need for extreme reliability of performance over long periods of rugged use, and the requirement that such mechanisms be of a versatile nature and capable of being installed in various types of vehicles.

It is an object of the present invention to provide a novel and improved switch mechanism especially adapted for use in systems in this type, which is inherently accurate and reliable in performance, and will not vary the predetermined torque at which switch actuation will take place.

It is another object to provide an improved switch mechanism of this nature, which is capable of installation in systems where the torque-applying device rotates in either direction, the predetermined torque which will cause switch actuation being equal regardless of the direction in which the torque is applied.

Other objects, features and advantages of the present invention will become apparent from the subsequent description, taken in conjunction with the accompanying drawings.

In the drawings:

Figure 1 is a cross-sectional view in elevation of the improved switch mechanism taken along the line 1—1 of Figure 2 and showing the switch combined with a speed-responsive torque applying device; and Figure 2 is a top plan view of the switch mechanism with the cover removed, showing the relative location of the parts.

The improved switch mechanism of this invention, generally indicated at 11 in the drawings, is shown in conjunction with a speed-responsive fluid coupling generally indicated at 12, this coupling for purposes of illustration being of the type shown and claimed in copending application, Serial No. 621,680, filed November 13, 1956, by Emil E. Sivacek and assigned to the assignee of the present application. The fluid coupling in itself forms no part of the present invention and therefore need not be described in detail. In general, the coupling is adapted to transmit torque from a driving shaft 13 to a driven shaft 14. Shaft 13 may for example be connected to a cable (not shown) similar to the speedometer cable of an automotive vehicle which is driven by the vehicle engine, the drive shaft or a similar element. A viscous fluid fills a chamber 15 in the fluid coupling, this fluid causing torque transmission by virtue of its frictional contact with the driving and driven coupling elements. At low speeds of driving shaft 13, relatively little torque will be transmitted to driven shaft 14, but as the driving speed increases, the transmitted torque will also rise until, when a predetermined torque has been attained, switch 11 will be operated in a manner described below. At relatively high speeds of the driving member, the viscosity of the fluid in chamber 15 will decrease due to its increase in temperature, thereby tending to flatten out the torque curve as described in detail in the aforesaid copending application. When the speed of driving shaft 13 decreases sufficiently, the torque transmitted to driven shaft 14 will drop below the predetermined torque and switch 11 will return to its former position.

It will be appreciated that in various types of installations it might be required that switch 11 be operated by the predetermined torque regardless of the direction of rotation of driving shaft 13. For example, engineering requirements may dictate that in some vehicles driving shaft 13 be constantly driven in one direction, and in other vehicles driven in the opposite direction. In some cases, the connection of driving shaft 13 to the vehicle drive shaft would cause it to rotate in one direction when the vehicle goes forward and in the opposite direction when the vehicle backs up. As stated above, it is one of the objects of the present invention to provide a switch operating mechanism which will cause switch actuation at a predetermined torque regardless of the direction of rotation of driving shaft 13.

Both switch mechanism 11 and fluid coupling 12 are enclosed in an open-topped casing 16 of generally rectangular shape, the casing cover being removed in the drawings. A hollow boss 17 in the lower portion of casing 16 accommodates fluid coupling 12, a bushing 18 being secured to boss 17 and rotatably supporting driving shaft 13. Driven shaft 14 is supported at its lower end 19 by a bearing 21 disposed within an apertured portion 22 at the upper end of driving shaft 13. Driven shaft 14 extends upwardly through the shell of fluid coupling 12, and its upper end 23 is rotatably supported by a bearing 24 held by a bracket 25 which is secured within casing 16. In particular, bracket 25 has an upper main portion and a pair of spaced depending legs 26 which are secured by bolts 27 to the interior casing 16.

Switch 11 comprises a base 28 secured within casing 16 on which is mounted a stationary contact supporting bracket 29. This bracket carries an upstanding stationary contact 31 to which is connected an electrical conductor 32 leading from the casing. An L-shaped flange 33, best seen in Figure 2, is formed on bracket 29, and a movable contact arm 34 is pivotally mounted at its inner end on flange 33 for swinging movement in a horizontal direction. The outer end of arm 34 carries a movable contact 35 engageable with stationary contact 31 when arm 34 swings clockwise in Figure 1 to its lower position. The other side of arm 34 carries a member 36 engageable with a stop 37 carried by bracket 29.

The portion of arm 34 adjacent its pivot is forked, as seen in Figure 1, to provide clearance for a helical tension spring 38 which acts as an overcenter spring during movement of arm 34. One end 39 of spring 38 is connected to an intermediate portion of arm 34, while the other end is connected to a leg 42 of an actuating bracket 43. This bracket is secured to and forms part of the outer end 44 of a leaf spring arm 45, the inner end 46 of this arm being secured to an upstanding leg 47 of a stationary bracket 48 mounted on base 28. The arrangement is such that when arm 45 is deflected counterclockwise in Figure 2, bracket 43 will move downwardly carrying the adjacent portion of spring 38 past a line passing through the pivot axis of arm 34 and the connection between spring 38 and arm 34, thereby causing contact 35 to engage stationary contact 31 with a snap action. In a like manner, the reverse movement of these parts will cause snap action of the switch to its open position. An adjustable stop 49 is threadably mounted on bracket 48 and is engageable with the inner end of arm 45 to enable selection of the force required to deflect arm 45 in a counterclockwise direction. The point of engagement of stop 49 with arm 45 may be termed the "fixed" end of arm 45, since deflection of the arm will take place about this point.

Bracket 43 and the outer end 44 of spring arm 45 are formed in an arcuate fashion, as indicated by the reference numeral 51 in Figure 2, in order to clear the adjacent portion of driven shaft 14. An actuating cam 52 is staked to shaft 14 and serves to deflect bracket 43 and arm 45 when a preselected torque is applied in either direction to shaft 14. Cam 52 is of irregular shape as seen in Figure 2, being generally triangular with an enlarged portion surrounding shaft 14. Cam 52 is provided with two lobes, a longer lobe 53 extending away from the vicinity of switch 11, and a shorter lobe 54 extending toward the switch. Both of these lobes have flat surfaces which are in a common radial plane passing through the axis of shaft 14. When the torque applied to shaft 14 is below a predetermined level, these surfaces are adapted to simultaneously engage the adjacent surfaces of bracket 43 (equivalent to arm 45) due to the inherent springiness of arm 45, thus holding switch 11 in its open position as described previously. If cam 52 is turned counterclockwise slightly in Figure 2, lobe 53 will deflect the outer end of bracket 43 and the outer end 44 of arm 45 downwardly as seen in this figure, thus causing the switch to close. Likewise, if cam 52 is turned clockwise from its neutral position in Figure 2, lobe 54 will engage the intermediate portion 55 of bracket 43, forcing the bracket downwardly in Figure 2 together with the adjacent portion of arm 45, and switch 11 will again be shifted to its closed position. Upon reduction of the torque applied to shaft 14, cam 52 will return from either its clockwise or counterclockwise position to its neutral position, under the influence of spring arm 45, and switch 11 will snap back to its open position.

The present invention includes means for insuring that equal torques will cause actuation of switch 11, regardless of the direction of rotation of shaft 14. In order to accomplish this purpose, the length of lobe 53 bears approximately the same proportion to the length of lobe 54 as the length of arm 45 from the end of lobe 53 to stop 49 bears to the length of arm 45 from the end of lobe 54 to stop 49. In other words, if we designate the length of lobe 53 as L, the length of lobe 54 as L', the length of arm 45 from the end of lobe 53 to stop 49 as M, and the length of arm 49 from the end of lobe 54 to stop 49 as M', $$\frac{L}{L'} = \frac{M}{M'} \text{ (approximately)}$$

It should be understood that the relative proportions given are only approximate, and that the exact proportions of the parts should be so chosen as to take into account the characteristics of leaf spring arm 45 as well as other individual requirements of the construction. By properly varying the relative lengths of lobes 53 and 54, it will be possible to provide a switch mechanism which will be actuated when a predetermined torque is applied to shaft 14 in either direction.

The operation of the improved switch mechanism will be apparent from the foregoing discussion. The parts will normally be in the position shown in Figures 1 and 2, with movable contact 35 separated from stationary contact 31 and lobes 53 and 54 of actuating cam 52 flush with the adjacent surfaces of bracket 43 which forms part of arm 45. Assuming the assembly is installed in an automotive vehicle accelerating from a position of rest, and that driving shaft 13 is connected to the crankshaft of the vehicle engine to turn in a counterclockwise direction as shown in Figure 2, rotation of shaft 13 at relatively low speeds, say, below 100 R. P. M., will cause a relatively low torque to be transmitted to shaft 14 through fluid coupling 12. This torque will cause lobe 53 of cam 52 to be forced downwardly in Figure 2 against the outer end of bracket 43, but this force will be insufficient to overcome the resistance of spring arm 45. As driving shaft 13 speeds up, the torque applied to shaft 14 through fluid coupling 12 will be increased until the force exerted by lobe 53 on the outer end of bracket 43 is sufficient to cause deflection of arm 45. This will cause leg 42 of bracket 43, together with the attached end of spring 35, to move downwardly in Figure 2 until the overcenter action of spring 38 takes place, contact arm 34 moving downwardly to engage stationary contact 31 with a snap action. The parts will remain in this position until the torque on shaft 14 has been decreased, due to a decrease in the rotational speed of shaft 13, sufficiently to permit the springiness of arm 45 to force cam lobe 53 back to its original position. The end of spring 38 will again be shifted, causing snap action of switch 11 to its open position.

Assuming the assembly is installed in another type of vehicle in such manner that shaft 13 rotates clockwise in Figure 2 instead of counterclockwise, a similar action will take place except that lobe 54 of cam 52 will act upon leaf spring arm 45. Since the relative lengths of lobes 53 and 54 are so chosen that equal torques are required to deflect arm 45 regardless of the direction of rotation of cam 52, the assembly may be installed with equal facility in conjunction with any type of driving system for shaft 13 and will perform reliably and with continued accuracy.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a switch mechanism, a switch comprising a pair of contacts movable between open and closed positions, an arm connected to said switch and movable between a first position causing said switch to be opened and second position causing said switch to be closed, means holding one end of said arm against movement, a cam mounted for rotation in either direction, and a pair of lobes on said cam extending in opposite directions and engageable with said arm at spaced locations on the same side thereof, the first of said lobes extending away from the stationary end of said arm, said second lobe extending toward said stationary end, whereby said first lobe engages said arm at a location spaced further away from said stationary end than said second lobe, said first lobe being longer than said second lobe in such proportion that said arm will move between its said positions upon the application of a predetermined torque to said cam regardless of the direction of said torque.

2. In a switch mechanism, a switch having a pair of contacts movable between open and closed positions, a spring arm adjacent said switch, means connecting said arm to said switch whereby deflection of said arm between a first and a second position will actuate said switch, means holding one end of said arm against movement, a cam mounted on an axis transverse to said arm, means for applying a variable torque to said cam in either direction, and a pair of lobes on said cam engageable with the outer end of said arm at spaced locations on the same side thereof, one of said lobes extending away from the stationary end of said arm, the other end extending toward said stationary end, whereby said first lobe engages said arm at a location spaced further away from said stationary end than said second lobe, said first lobe being longer than said second lobe in such proportion that said arm will be moved between its first and second positions upon the application of a predetermined torque to said cam in either direction.

3. In a switch mechanism, a switch having a pair of contacts movable between open and closed positions, a leaf spring arm having a fixed end, an adjustable stop adjacent said fixed end for adjusting the initial deflecting force on said spring arm, a shaft adjacent the outer end of said arm and extending transversely thereto, a cam fixed to said shaft, and a pair of lobes on said cam extending radially in opposite directions, said lobes being engageable with said arm at spaced locations on the same side thereof, one of said lobes extending away from the fixed end of said arm, the other lobe extending toward said fixed end, whereby said first lobe engages said arm at a location spaced further away from said stationary end than said second lobe, said first lobe being longer than said second lobe in such proportion that said arm will be deflected between its operative positions upon the application of a predetermined torque to said shaft in either direction.

4. In a snap action switch mechanism, a movable contact arm, a pivotal support for one end of said contact arm, the arm being movable between first and second positions, a leaf spring arm mounted adjacent said contact arm, one end of said spring arm being fixed, an overcenter tension spring connected between said spring arm and contact arm, whereby deflection of said spring arm between first and second positions will cause said contact arm to move between its first and second positions, a cam adjacent the outer end of said spring arm and rotatable on an axis transverse thereto, and a pair of lobes on said cam engageable with the same side of said spring arm at spaced locations, one of said lobes extending away from the fixed end of said spring arm, the other lobe extending toward said fixed end, whereby said first lobe engages said arm at a location spaced further away from said stationary end than said second lobe, said first lobe being longer than said second lobe in such proportion that said spring arm will move between its first and second positions upon the application of a predetermined torque to said cam in either direction.

5. In a snap action switch mechanism, a movable contact arm, a pivot support for one end of said contact arm, a movable contact at the outer end of said contact arm, a fixed contact engageable by said movable contact, a stop spaced from said fixed contact, said contact arm being movable from a first position engaging said stop to a second position causing engagement of said contacts, a leaf spring arm adjacent said contact arm and extending in generally parallel relation thereto, a stationary support for one extremity of said spring arm, an adjustable stop for preselecting the initial deflecting force for said spring arm, said adjustable stop being engageable with said spring arm adjacent said one extremity to provide a fixed end about which said arm may be deflected, a bracket extending transversely from said spring arm at an intermediate portion thereof, an overcenter tension spring connected between said bracket and an intermediate portion of said contact arm, whereby deflection of said spring arm from a first to a second position will cause snap action of said switch, a shaft adjacent the outer portion of said spring arm and extending transversely thereto, the portion of said spring arm adjacent said shaft being arcuately bent to clear said shaft, a cam secured to said shaft, and a pair of lobes on said cam having radially extending surfaces engageable with the same side of said spring arm on opposite sides of said arcuately bent portion one of said lobes extending away from the fixed end of said spring arm, the other lobe extending toward said fixed end, said first lobe being longer than said second lobe in such proportion that said spring arm will be deflected from its first to its second position upon the application of said predetermined torque to said shaft in either direction.

References Cited in the file of this patent
UNITED STATES PATENTS

| | | |
|---|---|---|
| 2,210,947 | Meyers et al. | Aug. 13, 1940 |
| 2,460,695 | Hennessy | Feb. 1, 1949 |
| 2,680,969 | Spengler | June 15, 1954 |
| 2,711,448 | Shewmon et al. | June 21, 1955 |

FOREIGN PATENTS

| | | |
|---|---|---|
| 661,106 | France | Feb. 26, 1929 |